(12) United States Patent
Nelson

(10) Patent No.: US 6,278,624 B1
(45) Date of Patent: Aug. 21, 2001

(54) HIGH AVAILABILITY DC POWER SUPPLY WITH ISOLATED INPUTS, DIODE-OR-CONNECTED OUTPUTS, AND POWER FACTOR CORRECTION

(75) Inventor: Gerald Jerome Nelson, Roseville, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/452,310

(22) Filed: Dec. 1, 1999

(51) Int. Cl.⁷ .................................................. H02M 3/335
(52) U.S. Cl. ........................................... 363/65; 363/21.15
(58) Field of Search .................................... 363/21.15, 65, 363/70, 71

(56) References Cited

U.S. PATENT DOCUMENTS

| | | | |
|---|---|---|---|
| 4,257,090 | * | 3/1981 | Kroger et al. .......................... 363/65 |
| 4,290,101 | * | 9/1981 | Hergenhan .............................. 363/21 |
| 4,628,433 | * | 12/1986 | Notohamiprodjo ..................... 363/65 |
| 4,635,179 | * | 1/1987 | Carsten .................................. 363/70 |
| 4,860,188 | * | 8/1989 | Bailey et al. .......................... 363/65 |
| 5,179,510 | * | 1/1993 | Tokiwa et al. ......................... 363/65 |
| 5,229,928 | * | 7/1993 | Karlsson et al. ....................... 363/71 |
| 5,319,536 | * | 6/1994 | Malik ..................................... 363/70 |
| 5,521,809 | * | 5/1996 | Ashley et al. .......................... 363/71 |
| 5,583,753 | * | 12/1996 | Takayama ............................... 363/71 |
| 5,790,394 | * | 8/1998 | Cabaniss et al. ....................... 363/65 |
| 5,969,961 | * | 10/1999 | Yero ...................................... 363/65 |
| 6,014,322 | * | 1/2000 | Higashi et al. ......................... 363/71 |
| 6,081,437 | * | 6/2000 | Chen et al. ............................. 363/70 |

* cited by examiner

Primary Examiner—Jeffrey Sterrett

(57) ABSTRACT

A high availability DC power supply with isolated inputs. The high availability power supply includes a first diode having a first diode output and a second diode having a second diode output. A first isolated direct current power supply is coupled to the first diode. An output power bus defined by the first diode output coupled to the second diode output is provided. The output power bus is still available to supply power upon the loss of the first isolated direct current power supply or the loss of the second isolated direct current power supply.

11 Claims, 3 Drawing Sheets

HIGH AVAILABILITY DC POWER SUPPLY WITH ISOLATED INPUTS, DIODE-OR-CONNECTED OUTPUTS, AND POWER FACTOR CORRECTION

THE FIELD OF THE INVENTION

The present invention generally relates to a high availability DC power supply, and more particularly, to a high availability DC power supply with multiple isolated inputs coupled to a common DC output power bus, wherein upon loss of one or more isolated inputs, the DC output power bus is still available to supply power.

BACKGROUND OF THE INVENTION

Businesses rely on a network of critical systems (e.g., computer and telephone systems) for everyday operation. Such systems are commonly utilized for storing and accessing information, communication, or manufacturing purposes. Most of these critical systems require a constant supply of direct current (DC) power to operate. Loss of power provided by a DC power supply to a critical system may result in failure of a business to be able to perform day to day operations.

A DC power supply receives a power input from an alternating current (AC) or DC power source, and provides a DC power output at a voltage required by the critical system. DC power supplies are designed to be capable of receiving power from multiple AC or DC sources in order to increase reliability by maintaining a constant supply of power. Such systems often require complex control or switching schemes in order to switch from one power source to another if one of the power sources is unavailable (e.g., due to a power failure). Often times the switching and control systems are very costly and/or very complex to operate.

One known DC power supply is capable of receiving multiple AC power inputs. The independent sources of power may have grounds which are not at the same potential, and as such, must be maintained in isolation from each other. The DC power supply includes a transformer for each separate AC power input, and control technology on both the primary and secondary side of each transformer. Complex isolation technology is provided on the secondary side of the transformer in order to maintain isolation of the separate power supply inputs. The duplication of technology on both the primary and secondary side of each transformer may result in a costly and complex DC power supply system.

SUMMARY OF THE INVENTION

The present invention is a high availability DC power supply with isolated inputs and a common DC output power bus. The isolated inputs can be coupled to independent AC and DC power sources wherein the output power bus is still available to supply power upon the loss of one or more of the input power sources.

In one embodiment, the present invention provides a high availability power supply. The power supply includes a first diode having a first diode output, and a second diode having a second diode output. A first isolated direct current power supply is coupled to the first diode. A second isolated direct current power supply is coupled to the second diode. An output power bus is defined by the first diode output coupled to the second diode output, wherein the output power bus is still available to supply power upon the loss of the first isolated direct current power supply or the loss of the second isolated direct current power supply.

In one aspect, the first isolated direct current power supply includes a first isolating transformer having a first direct current power source input. The second isolated direct current power supply includes a second isolating transformer having a second direct current power source input. The second direct current power source input is different from the first direct current power source input. In one aspect, the first isolating transformer is an isolating fly-back transformer. The first direct current power source input includes an alternating current power source input coupled to an AC to DC converter.

In one aspect, the first isolated direct current power supply is a voltage regulated power supply and the second isolated direct current power supply is a voltage regulated power supply. The power supply may further include a first feedback control loop coupled to the first isolated current power supply and a second feedback control loop coupled to the second isolated direct current power supply for maintaining a desired voltage at the output power bus.

In one aspect, the power supply includes a power factor correction system coupled to the first feedback control loop. The first diode is a high speed, fast recovery diode of appropriate voltage and rating.

In another embodiment, the present invention provides a high availability power supply. The high availability power supply includes a first diode having a first diode output. A second diode is provided having a second diode output. A first isolated direct current power supply is provided including a first isolating transformer coupled to the first diode. A second isolated direct current power supply is provided including a second isolating transformer coupled to the second diode. An output power bus is provided defined by the first diode output coupled to the second diode output. The output power bus maintains its availability to supply power upon the loss of the first isolated direct current power supply with the lose of the second isolated direct current power supply.

In one aspect, a first feedback control loop is coupled to the first isolated direct current power supply and a second feedback control loop is coupled to the second isolated direct current power supply for maintaining a desired voltage at the output power bus. A power factor correction system is coupled to the first feedback control loop.

In one aspect, the first isolating transformer is an isolating fly-back transformer. The first direct current power supply includes an alternating current power source coupled to an AC to DC converter. A voltage regulation control system is coupled to the first isolated direct current power supply. A first feedback control loop is coupled to the voltage regulation control system. A power factor correction system is coupled to the first isolated direct current power supply.

In one aspect, the first diode is a high speed, fast recovery diode and the second diode is a high speed, fast recovery diode.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
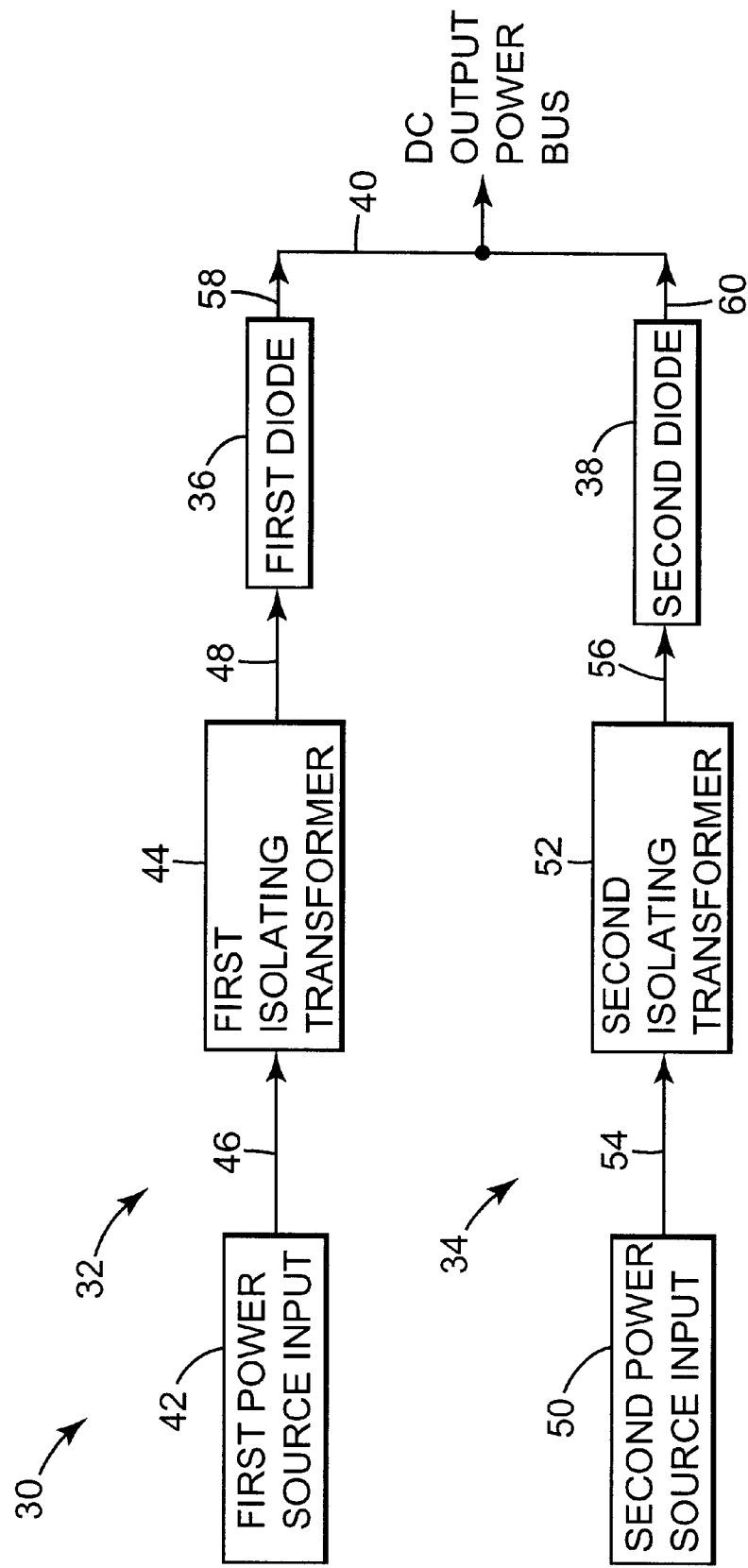
FIG. 1 is a block diagram illustrating one exemplary embodiment of a high availability DC power supply in accordance with the present invention.

In FIG. 1, a high availability DC power supply in accordance with the present invention is generally shown at 30. The high availability DC power supply 30 allows multiple independent power sources (AC or DC) to be connected to a common DC output power bus. The DC output power bus is available to provide an uninterrupted supply of power to critical systems (e.g., computer or telephone) upon the loss of one or more power sources. The DC power supply operates to isolate the independent power sources from each other, having a summed output through one-way switch mechanisms or diodes. As such, complex switching circuits are not required to maintain an uninterrupted power supply at the DC output power bus.

The present invention allows for high availability to be achieved using multiple power sources, whether they are from a utility, battery source, generator source or other power source. The present invention minimizes costs and increases reliability through reduced parts count. Further, the present invention minimizes physical size requirements of a high availability power system.

In one embodiment, high availability DC power supply 30 includes a first isolated DC power supply 32 and a second isolated DC power supply 34. The first isolated DC power supply 32 includes a first diode 36 and the second isolated DC power supply includes a second diode 38, coupled together at DC output power bus 40. The first isolated DC power supply 32 and second isolated DC power supply 34 provide a summed output to DC output power bus 40 through the first diode 36 and second diode 38, respectively. In particular, the first isolated DC power supply 32 includes a first power source input 42 coupled to a first isolating transformer 44, indicated at 46. First isolating transformer 44 includes an isolated output 48 to first diode 36. Similarly, second isolated DC power supply 34 includes second power source input 50 coupled to second isolating transformer 52, indicated at 54. Second isolating transformer 52 provides an isolated output 56 to second diode 38. The output 58 of first diode 36 and the output 60 of second diode 38 are provided to (i.e., summed at) DC output power bus 40.

First power source input 42 is independent from second power source input 50, and may be referenced to different power grids. First power source input 42 can be an AC or DC power source. For example, second power source input 50 can be an AC power source having a different phase than first power source input 42 or can also be a DC power source input (e.g., from a DC generator or battery). Since first power source input 42 is isolated from second power source input 50 via first isolating transformer 44 and second isolating transformer 52, the power sources 42, 50 may have grounds at different potentials while being coupled to a common DC output power bus 40.

In operation, first power source input 42 is provided to first isolating transformer 44 to provide an isolated output 48 to DC output power bus 40 via first diode 36. Similarly, second power source input 50 is provided to second isolating transformer 52 to provide an isolated output 56 to DC output power bus 40 via second diode 38. First isolating transformer 44 and second isolating transformer 52 operate to isolate the power supply inputs and transform the voltage (e.g., step-up or stepdown) to the desired voltage level of DC output power bus 40 (e.g., a 400 volt or 200 volt DC power bus or other appropriate voltages). The DC output power bus 40 is still available to supply power upon loss of either the first isolated DC power supply 32 or the second isolated DC power supply 34. Isolated output 48 and isolated output 56 are summed at DC output power bus 40. Since isolated output 48 and isolated output 56 are coupled to DC output power bus 40 via first diode 36 and second diode 38, additional complex switching systems are not required to provide an uninterrupted DC output power supply 40 upon the loss of either the first power source input 42 or the second power source input 50. Due to the isolated outputs 48 and 56, complex control circuitry is not required on the secondary of isolating transformer 44 and isolating transformer 52 in order to coupled them to a common DC output power bus.

Figure 2:
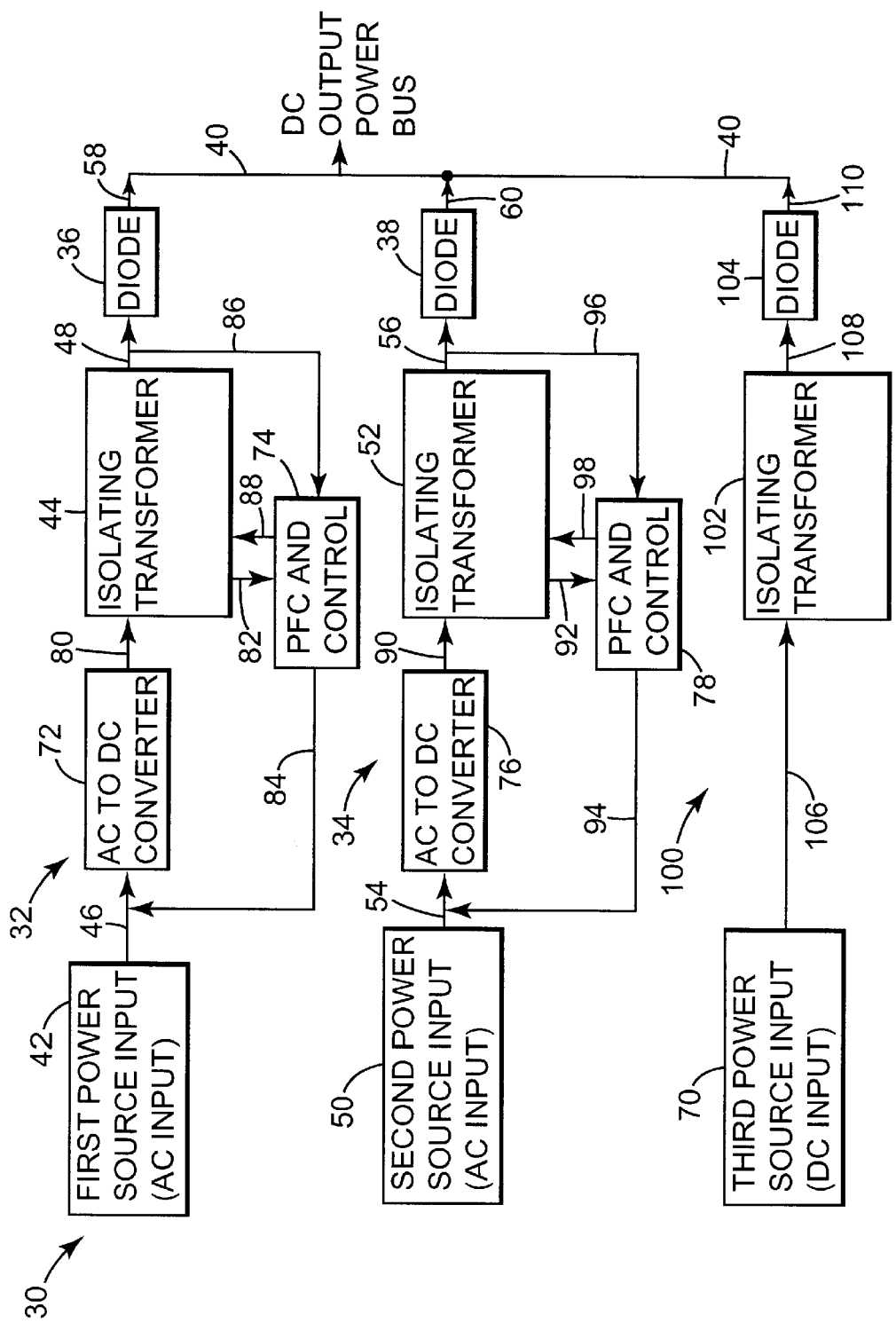
FIG. 2 is a block diagram illustrating another exemplary embodiment of a high availability DC power supply in accordance with the present invention.

First diode 36 and second diode 38 also function to isolate the first isolated DC power supply 32 from the second isolated DC power supply 34 upon loss of either power supply. First diode 36 and second diode 38 operate as one directional switching devices, and only allow power flow in a single direction to DC output power bus 40. For example, upon loss of first power source input 42 power will no longer flow to DC output power bus 40 via first diode 36. Further, since first diode 36 only allows power to flow in a single direction, first diode 36 operates to isolate the first isolated DC power supply 32 from power flowing on the DC output power bus. First diode 36 does not allow power to flow in an opposite direction, backfeeding the first isolated DC power supply 32 and avoiding a possibly dangerous condition should power be allowed to backfeed with the loss of the first power source input 42. First diode 36 and second diode 38 allow for an immediate transition from two power sources to one power source with no delay and with no other electronics or complex switching and control required In FIG. 2, one exemplary embodiment of high availability DC power supply 30 in accordance with the present invention is generally shown. High availability DC power supply 30 includes first power source input 42, second power source input 50, and third power source input 70. In the exemplary embodiment shown, first power source input 42 is an AC power source, second power source input 50 is an AC power source, and third power source input 70 is a DC power source. Upon the loss of first power source input 42, second power source input 50, or third power source input 70, output power is maintained at DC output power bus 40.

First isolated power supply 32 includes AC to DC converter 72 and power factor correction (PFC) and control 74. First power source input 42 is provided to AC to DC converter 72 for converting the AC input voltage to a DC output voltage. The DC output signal 80 of AC to DC converter 72 is provided to isolating transformer 44. PFC and control 74 is provided for power factor correction and monitoring control characteristics of the first isolated DC power supply 32. PFC and control 74 is provided with control power via an auxiliary winding in isolating transformer 44, indicated at 82. Power factor correction output is indicated at 84.

PFC and control 74 may include a voltage regulation mechanism for regulating the output voltage to DC output power bus 40. An output feedback signal 86 is provided to PFC and control 74. In response to the output feedback signal 86, the PFC and control 74 regulates the voltage output via isolating transformer 44, indicated at 88.

Similarly, second isolated DC power supply 34 includes AC to DC converter 76 and PFC and control 78. Second power source input 50 is provided to AC to DC converter 76 for converting the AC input voltage to a DC output voltage. The DC output signal 90 of AC to DC converter 76 is provided to isolating transformer 52. PFC and control 78 is provided for power factor correction and monitoring control characteristics of the second isolated DC power supply 34. PFC and control 78 is powered via an auxiliary winding in isolating transformer 52, indicated at 98. Power factor correction output is indicated at 94.

PFC and control 78 may include a voltage regulation mechanism for regulating the output voltage to DC output power bus 40. An output feedback signal 96 is provided to PFC and control 78. In response to the output feedback signal 96, the PFC and control 78 regulates the voltage output via isolating transformer 52, indicated at 98.

Third power source input 70 is provided to third isolated DC power supply 100. In particular, third isolated DC power supply 100 includes an isolating transformer 102 coupled to DC output power bus 40 through a diode 104. In operation, the third power source input 70 is provided to isolating transformer 102, indicated at 106. Isolating transformer 102 can be similar to the isolating transformers 44, 52. Isolating transformer 102 provides an isolated output signal 108 to diode 104. The output 110 of diode 104 is provided to DC output power bus 40.

During operation of high availability DC power supply 30, one or two of the three power source inputs 42, 50, 70 may be lost, without interrupting power supplied via DC output power bus 40. First power source input 42, second power source input 50 and third power source input 70 are independent power sources and may all be referenced to grounds at different potentials. The isolated outputs 48, 56, 108 are all summed at DC output power bus 40 via the outputs 58, 60, 110 of diodes 36, 60, 104.

Figure 3:
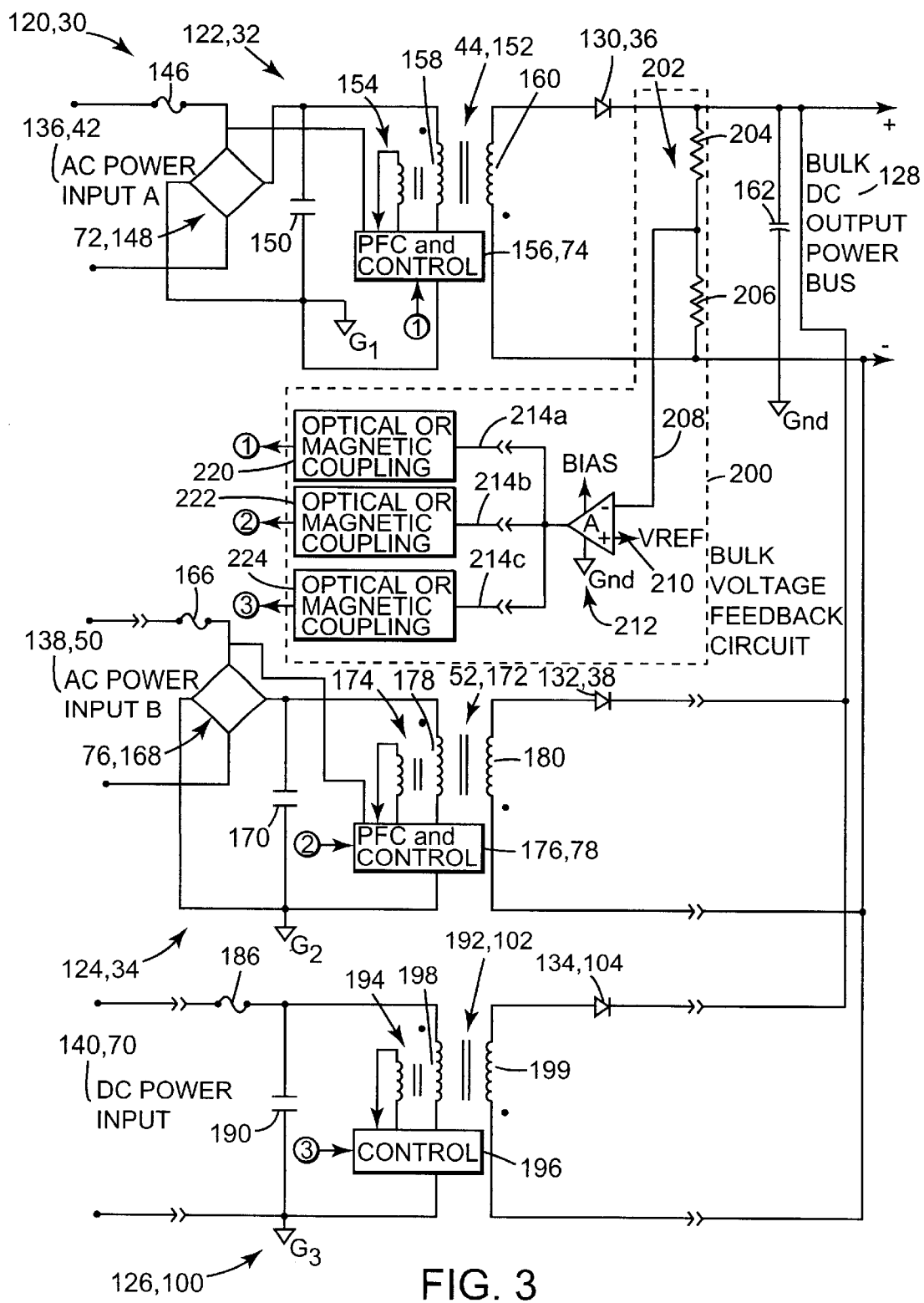
FIG. 3 is an electrical diagram illustrating another exemplary embodiment of a high availability DC power supply in accordance with the present invention.

In FIG. 3, an electrical diagram is shown illustrating one exemplary embodiment of a high availability DC power supply 120 in accordance with the present invention. The high availability DC power supply 120 can be similar to high availability DC power supply 30 previously described herein.

The high availability power supply 120 includes first isolated DC power supply 122, second isolated DC power supply 124 and third isolated DC power supply 126. The outputs of first isolated DC power supply 122, second isolated DC power supply 124 and third isolated DC power supply 126 are summed at bulk DC output power bus 128 through first diode 130, second diode 132 and third diode 134, respectively.

The high availability DC power supply 120 is supplied power via multiple input power sources, indicated as AC power input 136, AC power input 138 and DC power input 140. AC power input 136 supplies power to first isolated DC power supply 122. AC power input 138 supplies power to second isolated DC power supply 124. DC power input 140 supplies power to third isolated DC power supply 126. If power is unavailable from any two of the power input sources 136, 138, 140, the high availability DC power supply 120 remains available to provide an uninterrupted supply power at bulk DC output power bus 128, without it being necessary to switch between input power sources.

Diodes 130, 132 and 134 function to isolate the high availability DC power supply 120 from the input power sources 136, 138, 140 which may become unavailable. Diodes 130, 132, 134 operate as one-directional switching devices, and only allow power flow in a single direction to DC output power bus 128. For example, upon loss of first isolated DC power supply 122 power will no longer flow to DC output power bus 128 via first diode 130. Further, since first diode 130 only allows power to flow in a single direction, first diode 130 operates to isolate the first isolated DC power supply 122 from power flowing on the DC output power bus 128. First diode 130 does not allow power to flow in an opposite direction, backfeeding the first isolated DC power supply 122 and avoiding a possibly dangerous condition should power be allowed to backfeed with the loss of the first power source input 136. Diodes 130, 132, 134 allow for an immediate transition from multiple power sources to one or more less power sources with no delay and no other electronics or complex switching and control required.

In one exemplary embodiment, AC power input 136 is 120 volts AC, AC power input 138 is 240 volts AC, DC power input 140 is 48 volts DC and the bulk DC output power bus 128 is a 400 volt DC power bus. Input and output voltages may vary based on each specific application of the present invention.

First isolated power supply 124 includes fuse 146, rectifier 148, capacitor 150, and isolating transformer 152. A control power transformer 154 provides control power to PFC and control circuitry 156. One exemplary embodiment of PFC and control circuitry is described in detail later in this specification.

Power is supplied to first isolated DC power supply 122 at AC power input 136. The first isolated DC power supply 122 is current/overload protected via overcurrent protection device fuse 146. The AC power signal is converted to a DC power signal by full wave rectifier 148 and holding capacitor 150. The input power supply is referenced to ground G1.

Next, the DC power signal passes through isolating transformer 152. Isolating transformer 152 includes a primary side 158 and a secondary side 160. The full wave rectified DC power signal is input to the primary side 158. The isolating transformer 152 provides an isolated DC output signal at its secondary side 160. The isolating transformer 152 operates to transform the voltage to the desired voltage of the bulk DC output power bus 128 (e.g., 400 volts) and isolates the output signal. The DC output signal on secondary 160 of isolating transformer 152 is rectified by one-way switch mechanism or diode 130 and filtered by capacitor 162.

Similarly, power is supplied to second isolated DC power supply 124 at AC power input 138. The second isolated DC power supply 124 is current/overload protected via overcurrent protection device fuse 166. The AC power signal is converted to a DC power signal by full wave rectifier 168 and holding capacitor 170. The input power supply is referenced to ground G2.

Next, the DC power signal passes through isolating transformer 172. Isolating transformer 172 includes a primary side 178 and a secondary side 180. The full wave rectified DC power signal is input to the primary side 178. The isolating transformer 172 provides an isolated DC output signal at its secondary side 180. The isolating transformer 172 operates to transform the voltage to the desired voltage of the bulk DC output power bus 128 (e.g., 400 volts or other appropriate voltages) and isolates the output signal. The DC output signal on secondary 180 of isolating transformer 172 is rectified by one-way switch mechanism or diode 132 and filtered by capacitor 162.

Power is supplied to third isolated DC power supply 126 at DC power input 140. The third isolated DC power supply 126 is current/overload protected via overcurrent protection device fuse 186. A holding/filtering capacitor 150 operates to filter the DC power input 140. The input power supply is referenced to ground G3.

The DC power signal passes through isolating transformer 192. Isolating transformer 192 includes a primary side 198 and a secondary side 199. The DC power signal is input to the primary side 198. The isolating transformer 192 provides an isolated DC output signal at its secondary side 200. The isolating transformer 192 operates to transform the voltage to the desired voltage of the bulk DC output power bus 128 (e.g., 400 volts or other appropriate voltages) and isolates the output signal. The DC output signal on secondary side 199 of isolating transformer 192 is rectified by one-way switch mechanism or diode 134 and filtered by capacitor 162.

Preferably, the isolating transformers used herein are isolating flyback transformers. One suitable isolating transformer manufacturer for use in a high availability DC power supply in accordance with the present invention is available under the tradename Switchmode isolating flyback transformers commercially available from Coilcraft located in Cary, Ill., U.S.A. These isolating flyback transformers have a standard ferrite E core, with frequency ranges between 10 kHz–250 kHz and higher, and a power range between 1–1,000 Watts. Other isolating flyback transformers suitable for use with the high availability DC power supply in accordance with the present invention will become apparent to those skilled in the art after reading the present application.

Preferably, the one-way switch mechanisms or diodes is a high speed, fast recovery diode. One suitable one-way switch mechanism or diode for use in a high availability DC power supply in accordance with the present invention is available under the tradename Motorola MUR860 SWITCHMODE Power Rectifier, commercially available from Motorola, Inc. This diode is an ultrafast rectifier, 600 volts, 25–75 nanosecond recovery time, having an average forward current of 8 amps. Other one-way switch mechanisms or diodes suitable for use with the high availability DC power supply in accordance with the present invention will become apparent to those skilled in the art after reading the present application.

A bulk voltage feedback circuit 200 is provided to provide a voltage feedback signal from bulk DC output power bus 128 to PFC and control circuitry 156, PFC and control circuitry 176 and control circuitry 196. The voltage feedback signal is utilized by PFC and control circuitry 156, PFC and control circuitry 176 and control circuitry 196 to monitor and regulate the output voltage level on bulk DC output power bus 128. In one aspect, the bulk voltage feedback circuit 200 includes a voltage divider 202 having first resistor 204 and second resistor 206, voltage feedback signal 208, reference voltage 210, comparitor 212, and first output 214, second output 216, and third output 218.

In operation, voltage feedback signal 208 is provided from voltage provider 202 to comparitor circuit 212. At comparitor circuit 212, the voltage feedback signal 208 is compared to a reference voltage 210 and provides a corresponding output signal 214, indicated as 214A, 214B, 214C. First output signal 214A is provided to PFC and control 156 via optical or magnetic coupling device 220. Second output signal 214B is provided to PFC and control 176 via optical or magnetic coupling device 222. Third output signal 214C is provided to control circuitry 196 via optical or magnetic coupling device 224.

PFC and control circuitry 156, PFC and control circuitry 176 and control circuitry 196 are powered via control power transformers 154, 174 and 194. The control power transformers 154, 174, 194 can be separate control power transformers or may be auxiliary transformers tapped off of corresponding isolating flyback transformers 152, 172, 192.

PFC and control circuitry 156 and PFC and control circuitry 176 provide for power factor correction to AC power input 136 and AC power input 138. PFC and control circuitry 156, PFC and control circuitry 176 and control circuitry 196 utilize the voltage feedback circuit first output 214A, second output 214B and third output 214C for voltage regulation, and also provide control circuitry for other control characteristics including turn-on waveshape and control, and overvoltage protection.

One suitable PFC and control circuitry device for use in a high availability DC power supply in accordance with the present invention is available under the tradename ON Semiconductor MC34262 Power Factor Controller commercially available from ON Semiconductor. This PFC and control circuitry device includes power factor control, zero current detection, transconductance error amplifier, internal bandgap reference, current sense comparator and totem pole output driver. Other PFC and control circuitry devices suitable for use with a high availability DC power supply in accordance with the present invention will become apparent to those skilled in the art after reading the present application.

One suitable control circuitry device for use in a high availability DC power supply in accordance with the present invention is available under the tradename Unitrode Products UC3825 commercially available from Texas Instruments. This control circuitry device includes a wide band error amplifier, trimmed bandgap reference, soft start/mar-duty cycle control under voltage lockout and totem pole output. Other control circuitry devices suitable for use with a high availability DC power supply in accordance with the present invention will become apparent to those skilled in the art after reading the present application.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A high availability power supply comprising:
   a first diode having a first diode output;
   a second diode having a second diode output;
   a first isolated direct current power supply coupled to the first diode, the first isolated direct current power supply including a first isolating transformer which is an isolating flyback transformer directly coupled to the first diode;
   a second isolated direct current power supply coupled to the second diode, the second isolated direct current power supply including a second isolating transformer directly coupled to the second diode;

an output power bus defined by the first diode output coupled to the second diode output, wherein the output power bus is still available to supply power upon the loss of the first isolated direct current power supply or the loss of the second isolated direct current power supply;

a first feedback control loop coupled to the first isolated direct current power supply and a second feedback control loop coupled to the second isolated direct current power supply for maintaining a desired voltage at the output power bus; and a power factor correction system coupled to the first feedback control loop.

2. The power supply of claim 1, further wherein the first isolating transformer includes a first direct current power source input; and the second isolating transformer includes a second direct current power source input, wherein the second direct current power source input is different from the first direct current power source input.

3. The power supply of claim 2, wherein the first direct current power source input includes an alternating current power source input coupled to an AC to DC converter.

4. The power supply of claim 1, wherein the first diode is a high speed, fast recovery rectifier.

5. The power supply of claim 1, wherein the first isolated direct current power supply is a voltage regulated power supply and the second isolated direct current power supply is a voltage regulated power supply.

6. A high availability power supply comprising:

a first diode having a first diode input and a first diode output;

a second diode having a second diode input and a second diode output;

a first isolated direct current power supply including a first isolating transformer directly coupled to the first diode input, wherein the first isolating transformer is an isolating flyback transformer;

a second isolated direct current power supply including a second isolating transformer directly coupled to the second diode input; and an output power bus defined by the first diode output coupled to the second diode output, wherein the output power bus maintains its availability to supply power upon the loss of the first isolated direct current power supply or the loss of the second isolated direct current power supply;

a voltage regulation control system;

a first feedback control loop coupled to the voltage regulation control system; and a power factor correction system coupled to the first isolated direct current power supply.

7. The power supply of claim 6, wherein the first isolated direct current power supply is coupled to a first input power source referenced to a first ground, and wherein the second isolated direct current power supply is coupled to a second input power source referenced to a second ground, wherein the first ground is different from the second ground.

8. The power supply of claim 7, wherein the first input power source is an AC power source having a first phase, and the second input power source is an AC power source having a second phase different from the first phase.

9. The power supply of claim 6, wherein the first diode is a high speed, fast recovery rectifier.

10. The power supply of claim 9, wherein the second diode is a high speed, fast recovery rectifier.

11. The power supply of claim 6, wherein the first direct current power supply includes an alternating current power source input coupled to an AC to DC converter.

* * * * *